Nov. 8, 1960  F. P. HOPFELD  2,959,309
LIFT TRUCKS
Filed June 12, 1959  2 Sheets-Sheet 1
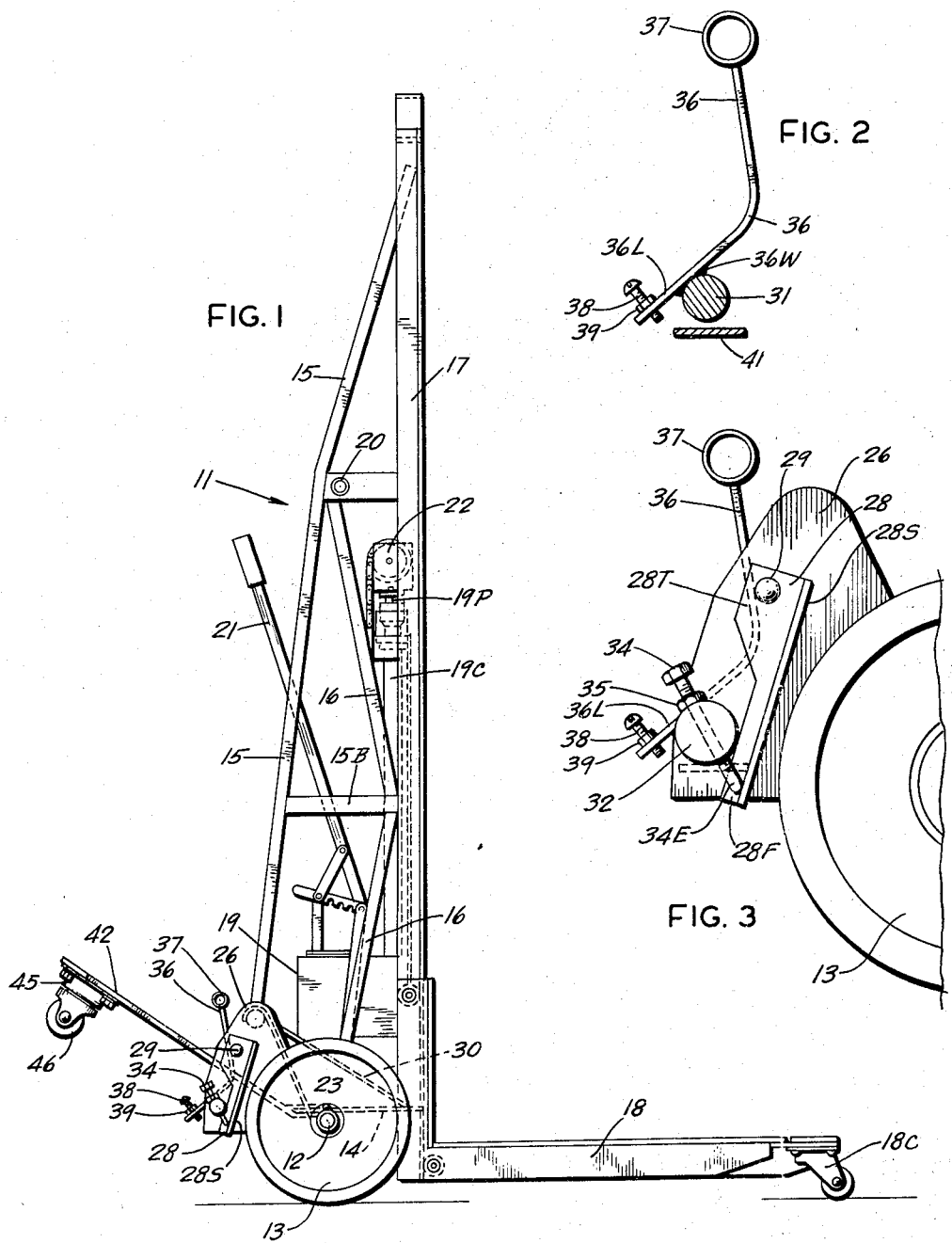
INVENTOR.
FRED P. HOPFELD
BY
Wallace and Cannon
ATTORNEYS Nov. 8, 1960  F. P. HOPFELD  2,959,309
LIFT TRUCKS
Filed June 12, 1959  2 Sheets-Sheet 2
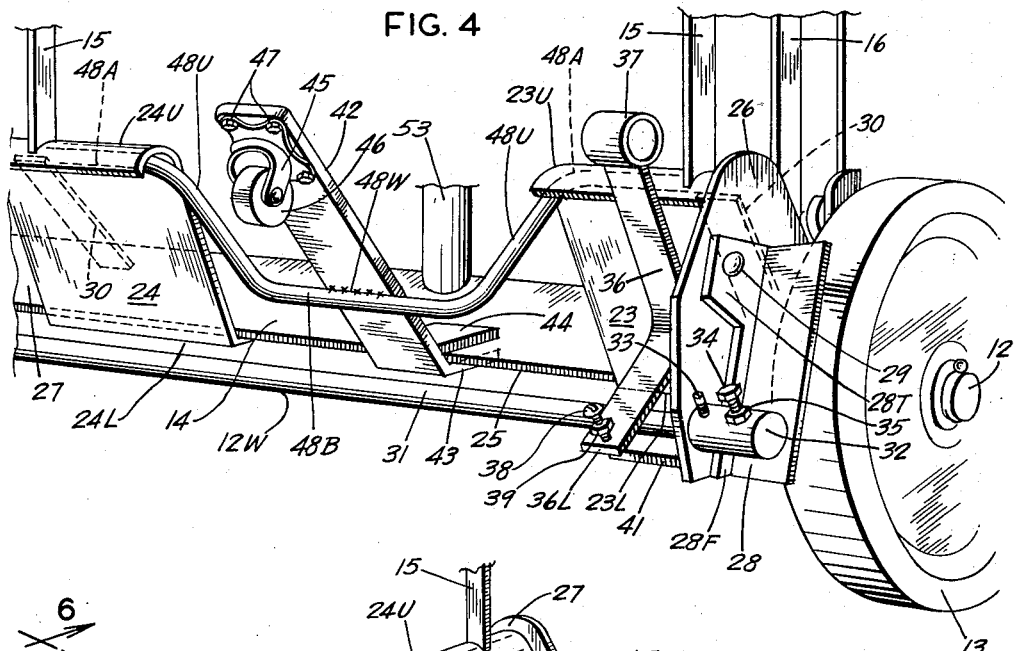
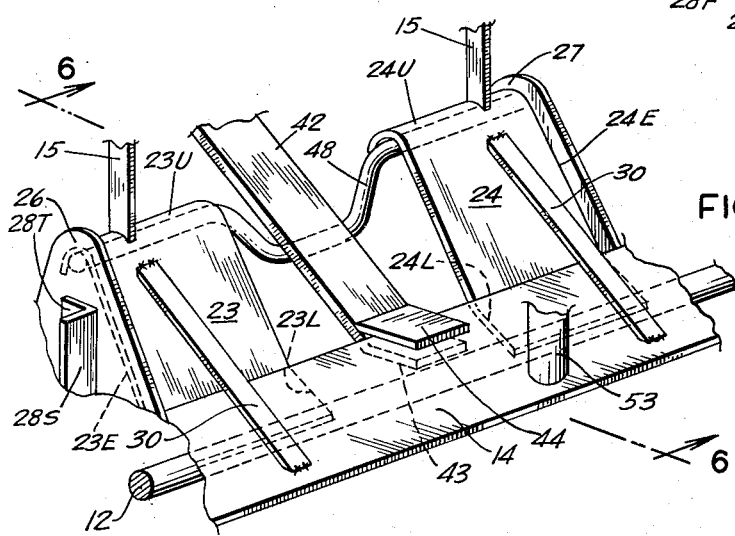
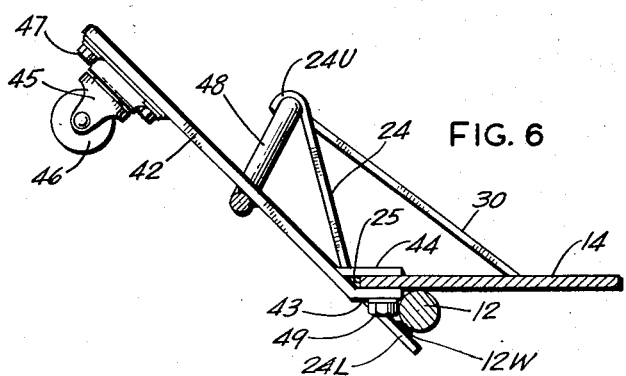
INVENTOR.
FRED P. HOPFELD
BY
Wallace and Cannon
ATTORNEYS United States Patent Office 2,959,309
Patented Nov. 8, 1960

2,959,309
LIFT TRUCKS
Fred P. Hopfeld, Elmwood Park, Ill., assignor to Grand Specialties Corporation, Chicago, Ill., a corporation of Illinois Filed June 12, 1959, Ser. No. 820,057
9 Claims. (Cl. 214—373)

This invention relates to lift trucks which incorporate an elevatable load carrying platform for lifting and transporting various types of cargo between different locations in warehouses, factories, and the like.

More specifically this invention relates to a lift truck of the foregoing kind having a mechanically actuated brake apparatus and an auxiliary pivot wheel structure associated therewith.

There are at the present time a large number of relatively small, manually-propelled and operated lift trucks which are utilized in various industrial and commerical applications for transporting loads between various locations in a convenient and facile manner. While such manually-propelled trucks are by themselves of relatively light weight and are easily movable, the hydraulically actuated lifting platforms commonly employed by such units permit an operator to raise and transport quite heavy cargoes. Such heavy cargoes involve considerable inertia and this can be particularly troublesome when attempting to park the truck on a sloped surface or when unloading a cargo. Thus, it is desirable to provide brake apparatus for such manually-propelled lift trucks in order that the loaded trucks may be maintained stationary at an unloading position, parked on a sloped surface, or parked safely in an unloaded position. Because of the initial cost factor and repair costs, it is desirable to avoid complicated auxiliary equipment, and it is therefore a primary object of this invention to provide an inexpensive and uncomplicated foot-operated, entirely mechanical braking system for a manually-propelled lift truck which is directly and conveniently applied in a simple and effective manner by the lift truck operator standing at the position required for propelling the lift struck.

It is another object to provide a braking system for a lift truck which incorporates a lever-actuated, rotatable rod provided with an adjustable brake actuating lug and an adjustable set screw which cooperates with a fixed stop for preventing sticking or binding of the brake system in a braked position.

Lift trucks of the kind involved, particularly when heavily loaded, are sometimes too difficult to maneuver in narrow areas such as when turning from one aisle at right angles into another aisle, or backing up against an unloading dock. It is therefore another object of this invention to enable the truck to be easily pivoted in a convenient fashion by a sturdy pivot wheel structure but which nevertheless can be detached from the truck framework. Specifically, it is a further object of the present invention to accomplish such pivoting action by having resort to an auxiliary castor wheel which is carried at the free end of a removably mounted, rearwardly projecting and upwardly inclined supporting arm for permitting the lift truck to be tilted backwardly to a position wherein at least a portion of the weight of the truck is supported by the auxiliary wheel and wherein greater leverage for pivoting the truck is obtained.

It is another object of this invention to provide an auxiliary wheel mounting arm and supporting structure which is readily attachable to or removable from a lift truck frame, but which at the same time is adequately supported to enable the auxiliary wheel to bear the entire load of the truck.

Other and further objects of the present invention will be apparent from the following description and claims and are illustrated in the accompanying drawings which, by way of illustration, show a preferred embodiment of the present invention and the principles therof and what is now considered to be the best mode contemplated for applying those principles. Other embodiments of the invention embodying the same or equivalent principles may be used and structural changes may be made as desired by those skilled in the art without departing from the present invention and the purview of the appended claims.

In the drawings:

Fig. 1 is a side elevation view of a manually propelled lift truck which incorporates an auxiliary wheel and braking apparatus constructed in accordance with this invention;

Fig. 2 is an enlarged detailed view of the foot-operated braking lever incorporated in the lift truck illustrated in Fig. 1;

Fig. 3 is an enlarged detailed view of a brake shoe and brake shoe actuating mechanism incorporated in the lift truck illustrated in Fig. 1;

Fig. 4 is an enlarged perspective view of a portion of the lift truck illustrated in Fig. 1;

Fig. 5 is a perspective view of a portion of the frame structure of the lift truck illustrated in Fig. 1; and Fig. 6 is an enlarged elevation view, partly in section, taken substantially in the direction of the arrows 6—6 in Fig. 5.

Referring now to Fig. 1, there is illustrated a manually-propelled lift truck indicated generally by the reference numeral 11. The lift truck incorporates a horizontally extending main axle 12 and a pair of wheels 13 rotatably mounted on the ends of the axle. A horizontally extending base plate 14 resides on upper surface of the axle 12 and is rigidly connected thereto by welding or other suitable means. A vertically extending frame member 16 is attached at a lower end to the upper surface of the base plate 14 at a location vertically disposed above the axle 12. A second vertical frame member 15 is connected to the frame member by a cross brace 15B. The frame members 15 and 16 provide a support for vertically extending guides 17 upon which the load carrying platform 18 is movable in upward and downward directions. A hydraulic unit 19 is mounted on the base plate by a short pillar 53 (Fig. 4) and includes a manually-operable lever 21, and a chain hoist 22 which is vertically movable by a piston 19P reciprocable within an upright cylindrical column 19C provides the lifting force for the platform 18. Thus, one end of the chain may be attached to the cylinder 19C or to a transverse member of the frame and the other end is attached to the platform 18. Upward movement of the piston 19P within the cylinder 19C is effective to lift the platform 18. A pair of castors 18C are detachably mounted at the forward corners of the platform and a horizontal push bar 20 is provided adjacent the upper end of the frame member 16. The truck is maneuvered and propelled by means of the push bar 20.

These structural features of the lift truck are described in greater detail in my application Serial No. 321,572, filed November 20, 1952.

In accordance with this invention, and as illustrated in Figs. 4 and 5, a pair of support members 23 and 24 have lower portions 23L and 24L rearward of the rear edge of the plate 14 and are welded at welds 12W to the axle 12 as will be apparent from Figs. 5 and 6. The support members 23 and 24 are inclined upwardly in a rearward direction and are provided with downwardly curved end portions 23U and 24U at the upper free ends thereof. The support members 23 and 24 are inside the wheels and provide lateral edges 23E and 24E. A pair of bracket members 26 and 27 abut the lateral edges 23E and 24E of the support members and are welded thereto. Thus the bracket members 26 and 27 are rigidly mounted transversely to the base plate 14 and the axle 12 and each provide vertically extending inner and outer surfaces. A pair of reinforcing braces 30 are rigidly attached at opposite ends to the upper portions of the support members 23 and 24 and the base plate 14 as shown in Fig. 5, and such rigid attachment is conveniently afforded by weldments.

A pair of plate members 28, only one of which is visible in Fig. 4, each of which includes a perpendicularly projecting flange portion 28F, are pivotally mounted on the outer surfaces of the respective bracket members 26 and 27 by rivets 29 which extend through an upper tab portion 28T of each flange and each bracket 26 and 27. The plate members 28 constitute simple but effective, pivotally mounted brake shoes and include forward friction surfaces 28S, as shown in Figs. 3 and 5, for engagement with the peripheries of the two related wheels 13. The flanges 28F provide both tab portions for mounting the brake shoes on the lift truck unit and also act to stiffen the brake shoes to resist deformation.

A brake actuating shaft 31 is rotatably mounted in the lower portions of the bracket members 26 and 27. At each end of the shaft 31 an end retainer cap member 32 is mounted thereon and is adjustable both in an axial and a rotational manner on the end of the rod by means of a set screw 33. With particular reference to Fig. 3 it will be noted that a cap screw 34 projects through the retainer 32 and terminates adjacent the shoe 28 in a rounded end portion 34E. A locking nut 35 is provided for locking the cap screw at any desired adjusted position with respect to the cap 32.

An operating angle lever 36, as best seen in Fig. 2, is welded adjacent a lower end 36L by a weld 36W to the rotatable shaft 31. The angle lever 36 includes a cylindrical knob 37 at its upper end enabling the same to be foot-operated, and additionally includes a lever portion 36L which projects below shaft 31 for a short distance. A manually adjustable screw 38 projects through the angle lever in the portion 36L below the rotatable shaft 31 and may be maintained in any desired position with respect to the lever means of a lock nut 39. The adjustable screw 38 is positioned to abut a stop plate 41 which is welded or otherwise rigidly attached to the inner surface of the right-hand bracket 26 or viewed in Fig. 4. The plate 41 and screw 38 thus provide an adjustable stop for limiting the downward rotation of the angled foot lever 36.

In accordance with the present invention there is also provided an auxiliary wheel assembly which includes an arm 42 formed with a mounting clamp comprising a pair of parallel extending plate members 43 and 44 affording a jaw or bifurcation in the lower end thereof. The parallel plates 43 and 44 are spaced to permit the arm 42 to be mounted on the rear edge portion 25 of the base plate 14 which projects rearwardly of the axle 12. A castor 45 which includes an auxiliary wheel 46 is mounted on the free or upper end of the arm 42 by means of a plurality of cap screws 47. As is illustrated in the drawings, the arm 42, when mounted on the base plate 14, is inclined upwardly in a rearward direction but at a lesser angle from the horizontal than that at which the support members 23 and 24 are inclined. A generally U-shaped support rod 48 has the medial depressed bight portion 48B thereof welded at 48W to the upper surface of the arm 42 as shown in Fig. 4. A pair of arms 48U extend upwardly from the bight 48B in a diverging relation, and these terminate in oppositely outwardly extending horizontal arms 48A which are received in the bends formed by the downwardly curved end portions 23U and 24U of the respective support members.

The ends 48A of the rod 48 are freely received within the curved portions 23U and 24U to engage the inner or downwardly facing concave surfaces thereof, and the lower bifurcation or plate member 43 is provided with a set screw 49, Fig. 6, which engages the lower surface of the base plate 14 so that the entire assembly of the arm 42, the auxiliary wheel 46, and the reinforcing rod 48 is readily attached to or removed from the lift truck as a separate unit.

In operation, the lift truck is positioned beneath a palatalized or other cargo and the platform 18 is hydraulically raised by operation of the manual lever 21 as explained above. In moving the cargo to the desired location, the operator may conveniently brake the lift truck by stepping on the cylindrical knob 37 to depress the lever 36 and rotate the brake operating shaft 31 in a counterclockwise direction as viewed in Figs. 1 to 3, noting that in these figures the brakes are disengaged. Such rotation of the shaft 31 causes the rounded ends of the projecting portions of the studs as 34E to engage the rear surfaces of the brake shoes and rotate the brake shoes about their pivots as 29 to move the forward surfaces of the related brake shoes into a frictional, braking engagement with the periphery of the related wheels 13. The amount of rotation of the shaft 31 is limited by the screw 38 engaging the edge of the stop plate 41. Thus, by suitable positioning of the cap screws 34 and the screw 38, the amount of rotation of the shaft 31 may be controlled to provide sufficient force to be developed on the brake shoe by the screws 34 to generate a desired braking force and yet to prevent the shaft from being rotated to a position wherein the screws 34 could be rotated too far so as to permit a sudden lock-up or sticking of the brakes. That is, the end 34E of each cap screw 34 is desirably positioned just far enough beyond the related cap member 32 so that the stop screw 38 prevents the cap screw from being rotated to a substantially perpendicular position with respect to the rear surface of the brake shoe. It should be noted also that the screws 34 and 38 are easily adjusted to compensate for wearing down of the wheel tread. The angled form of the brake lever permits the brake apparatus to be easily kicked to an over-balanced or non-operative position with the lift truck in a vertical position. That is, the brake lever normally remains in the over center position illustrated in Fig. 3 because the center of weight of the lever is displaced forward of the axis of the shaft 31.

With large loads on the left truck the operator may desire to utilize the auxiliary wheel arrangement to facilitate pivoting action of the lift truck. In such cases the lift truck is tilted backwardly until the auxiliary wheel 46 contacts the floor, and the load can be borne entirely by wheel 46. The load thus carried by the wheel 46 is transmitted in large part through the reinforcing and stabilizing rod 48, and the rod 48 in turn distributes such load to the curved portions 23U and 24U of the support members. Thus the support members serve a dual purpose. These members provide means for mounting the brake assembly on the lift truck unit and also serve as frame members for absorbing the load carried by the auxiliary wheel 46.

In either the upright or the tilted position of the lift truck the foot lever 36 is positioned to be conveniently actuated by the operator.

Thus in accordance with this invention there is provided a quite simple, foot-operated mechanical braking system which provides a conveniently applied, effective braking force simultaneously to the peripheries of both of the main wheels. Adjustable lug and stop screws are provided for obtaining an optimum amount of braking force while avoiding any tendency of the brakes to be over-used. Also in accordance with this invention there is provided an auxiliary wheel assembly, which can be mounted on the lift truck unit or removed therefrom in a quick and convenient manner merely by loosening the screw 49 and disassembling the associated parts, which facilitates pivotal action of the lift truck, and which utilizes the existing frame structure of the braking apparatus for distributing the load carried by the auxiliary wheel assembly.

Hence, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a lift truck having an axle and wheels rotatably mounted thereon, a base plate residing on and rigidly attached to an upper surface of the axle and having a rearward edge extending parallel with and disposed rearwardly of said axle, a pair of support members comprising metal plates each having end portions attached to said axle and inclined upwardly in a rearward direction, said support members having downwardly curved portions at the free end portions opposite the end portions attached to the axle, an arm supported at one end on the portion of the base plate extending rearwardly of the axle, said arm being inclined upwardly in a rearward direction at a lesser angle than said support members and having a castor mounted on the under surface of the arm adjacent an end of the arm for permitting the lift truck to be backwardly tilted to a position wherein the castor supports a portion of the weight of the truck to facilitate pivoting of said truck, and a reinforcing member having end portions disposed within the downwardly curved portions of the support members and rigidly attached at a central portion to said arm for transmitting the load sustained by the castor to said support members.

2. In a lift truck having an axle and wheels rotatably mounted thereon, a base plate residing on and rigidly attached to an upper surface of the axle and having a rearward edge extending parallel with and disposed rearwardly of said axle, a pair of support members comprising metal plates each having end portions attached to said axle and inclined upwardly in a rearward direction, said support members having downwardly curved portions at the free end portions opposite the end portions attached to the axle, an arm having two spaced parallel extending members and a set screw in one of said members detachably mounting an end of the arm on the portion of the base plate extending rearwardly of the axle, said arm being inclined upwardly in a rearward direction and having a castor mounted on the under surface of the arm adjacent an end of the arm, and a U-shaped load transmitting member having end portions freely disposed within the downwardly curved portions of the support members and rigidly attached at a central portion to said arm.

3. A foot-operated brake for a lift truck comprising, a mounting bracket rigidly attached to the lift truck and having outer and inner vertically extending surfaces, a plate member formed with a perpendicularly projecting flange at a lateral edge thereof and having a forward friction surface for engaging the periphery of a wheel of the lift truck and a rearward surface, the flange of said plate member being pivotally mounted on the outer surface of the mounting bracket, and means for engaging the friction surface of the plate member in braking engagement with the periphery of the wheel comprising, a shaft rotatably mounted in the bracket and mounting a cap member at an end of the shaft adjacent the rearward surface of the plate member, an adjustable cap screw projecting through the cap member, and an angled lever attached to the shaft at a point intermediate the ends of the lever for rotating the shaft to engage the cap screw with the rearward surface of the plate member and move said plate member about the pivot mount on the mounting bracket to a position wherein the friction surface engages the periphery of the lift truck wheel in a positive braking relation.

4. The foot-operated brake apparatus as recited in claim 3 including a stop member mounted on the inner surface of the mounting bracket and an adjustable set screw carried by said lever and operative to abut said stop member to limit rotation of said shaft.

5. The foot-operated brake apparatus as recited in claim 4 including a set screw for axially and angularly positioning said cap member on said shaft.

6. In a lift truck having an axle and wheels rotatably mounted thereon, a base plate rigidly supported on the truck, a pair of support members comprising metal plates each attached to said axle, said support members being inclined upwardly in a rearward direction and providing lateral edges spaced inwardly of said wheels, a pair of mounting brackets attached to said lateral edges and extending rearwardly in a direction transverse to said base plate and axle, a pair of brake shoes pivotally attached to said mounting brackets at the outer sides thereof and having friction surfaces disposed rearwardly of and facing the peripheries of said wheels, a shaft rotatably mounted in the mounting brackets and having adjustable studs at the ends thereof, said studs having ends engageable with said brake shoes, and a foot-operated lever for rotating the shaft to engage the studs with the brake shoes to rotate said shoes about the pivotal connections and into frictional engagement with the peripheries of the wheels.

7. In a lift truck having an axle and wheels rotatably mounted thereon, a base plate residing on the upper surface of the axle and rigidly attached thereto and having a rearward edge extending parallel with said axle, a pair of support members comprising metal plates each having upper surfaces engaged with said base plate rearward edge and attached to said axle, said support members being inclined upwardly in a rearward direction and providing lateral edges spaced inwardly of said wheels, a pair of mounting brackets attached to said lateral edges and extending rearwardly in a direction transverse to said base plate and axle, a pair of brake shoes pivotally attached to said mounting brackets at upper portions of said shoes and having friction surfaces disposed rearwardly of said wheels, a shaft rotatably mounted in the mounting brackets and having cap members mounting adjustable studs at the ends thereof, a foot-operated lever for rotating the shaft to engage the studs with the brake shoes to rotate said shoes about the pivotal connection and into frictional engagement with the peripheries of the wheels, and stop means on said shaft and one of said mounting brackets for limiting rotational movement of said shaft to prevent locking the brake shoes in braked relation with the wheels.

8. In a lift truck having an axle and wheels rotatably mounted thereon, a base plate residing on the upper surface of the axle and rigidly attached thereto and having a rearward edge extending parallel with said axle, a pair of support members comprising metal plates each having upper surfaces engaged with said base plate rearward edge and attached to said axle, said support members being inclined upwardly in a rearward direction and providing lateral edges spaced inwardly of said wheels, said support members having downwardly curved end portions opposite the portions connected to said axle, a rearwardly projecting, upwardly inclined arm connected at one end to said base plate and mounting a castor at an opposite end, a reinforcing member connected to the inclined arm and having end portions disposed within the curved portions of said support members, a pair of mounting brackets attached to said lateral edges and extending rearwardly in a direction transverse to said base plate and axle, a pair of brake shoes pivotally attached to said mounting brackets at upper portions of said shoes and having friction surfaces disposed rearwardly of said wheels, a shaft rotatably mounted in the mounting brackets and having adjustable studs at the ends thereof, and a foot-operated lever for rotating the shaft to engage the studs with the brake shoes to rotate said shoes about the pivotal connection and into frictional engagement with the peripheries of the wheels.

9. A foot-operated brake for a lift truck of the kind having a pair of wheels mounted at opposite ends of a load-bearing axle and comprising, a pair of mounting brackets rigidly attached to the lift truck adjacent each of said wheels, each of said mounting brackets having outer and inner vertically extending surfaces, a brake member pivotally mounted on each of said brackets, each brake member having a forward friction surface for engaging the periphery of an adjacent wheel of the lift truck and having a rearward surface, and means for engaging the friction surface of each brake member in braking engagement with the periphery of a respective wheel, said means comprising, a shaft rotatably mounted at opposite ends in said brackets, adjustbale screw means rotatable bodily within opposite end portions of said shaft and having ends located adjacent the forward surface of each brake member, and a foot-operated lever attached to the shaft for rotating the shaft to engage the screw means with the rearward surface of each brake member and cause the forward surface thereof to engage a respective wheel.

References Cited in the file of this patent
UNITED STATES PATENTS

| | | |
|---|---|---|
| 1,513,863 | Sabin | Nov. 4, 1924 |
| 2,477,294 | Fuller | July 26, 1949 |
| 2,685,351 | Kramcsak | Aug. 3, 1954 |